United States Patent
Miyagawa et al.

(10) Patent No.: US 10,942,482 B2
(45) Date of Patent: Mar. 9, 2021

(54) METHOD FOR MANUFACTURING BLADE FOR ELECTROPHOTOGRAPHIC DEVICES

(71) Applicant: Sumitomo Riko Company Limited, Aichi (JP)

(72) Inventors: Shimpei Miyagawa, Aichi (JP); Yoshihiro Saito, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/923,119

(22) Filed: Jul. 8, 2020

(65) Prior Publication Data
US 2020/0333740 A1    Oct. 22, 2020

Related U.S. Application Data

(63) Continuation of application No. PCT/JP2018/040467, filed on Oct. 31, 2018.

(30) Foreign Application Priority Data

Jan. 31, 2018 (JP) .............................. JP2018-014616

(51) Int. Cl.
*G03G 21/10* (2006.01)
*G03G 21/00* (2006.01)
(Continued)

(52) U.S. Cl.
CPC ....... *G03G 21/0017* (2013.01); *C08G 18/025* (2013.01); *C08G 18/80* (2013.01); *C09D 175/06* (2013.01)

(58) Field of Classification Search
USPC ....................................................... 399/350
See application file for complete search history.

(56) References Cited

U.S. PATENT DOCUMENTS

| | | | |
|---|---|---|---|
| 2016/0297989 A1 | 10/2016 | Nimura et al. | |
| 2017/0003643 A1* | 1/2017 | Aoyama | ............ G03G 21/0017 |

(Continued)

FOREIGN PATENT DOCUMENTS

| | | |
|---|---|---|
| JP | H08248851 | 9/1996 |
| JP | 2004280086 | 10/2004 |

(Continued)

OTHER PUBLICATIONS

"Written Opinion of the International Searching Authority (Form PCT/ISA/237) of PCT/JP2018/040467," dated Jan. 29, 2019, with English translation thereof, pp. 1-16.

(Continued)

*Primary Examiner* — Q Grainger
(74) *Attorney, Agent, or Firm* — JCIPRNET

(57) ABSTRACT

A method for manufacturing a blade for electrophotographic devices and a blade for electrophotographic devices are provided. The method includes: an impregnation step of impregnating, from the surface of at least a part of a blade-shaped substrate containing urethane rubber, with a blocked isocyanate in which an isocyanate group is blocked with a blocking agent, wherein the part includes a portion that comes into contact with a mating member; and a curing step of dissociating the blocking agent from the blocked isocyanate impregnated into the substrate in the impregnation step, and then curing the released isocyanate in the substrate to form a cured portion in at least the part of the substrate including the portion that comes into contact with the mating member. In the method, the isocyanate released from the blocked isocyanate includes an aromatic isocyanate.

1 Claim, 3 Drawing Sheets

(51) Int. Cl.
  *C08G 18/02*   (2006.01)
  *C08G 18/80*   (2006.01)
  *C09D 175/06*  (2006.01)

(56) References Cited

U.S. PATENT DOCUMENTS

2017/0017194 A1* 1/2017 Toyama ............. G03G 21/0017
2017/0361421 A1 12/2017 Willumstad et al.

FOREIGN PATENT DOCUMENTS

| JP | 2007156093 | 6/2007 |
| JP | 2015191084 | 11/2015 |
| JP | 2017097220 | 6/2017 |
| JP | 2017226828 | 12/2017 |

OTHER PUBLICATIONS

"International Search Report (Form PCT/ISA/210) of PCT/JP2018/040467," dated Jan. 29, 2019, with English translation thereof, pp. 1-4.

\* cited by examiner (a)

(b)

METHOD FOR MANUFACTURING BLADE FOR ELECTROPHOTOGRAPHIC DEVICES

CROSS-REFERENCE TO RELATED APPLICATIONS

This application is a continuation application of International Application number PCT/JP2018/040467 on Oct. 31, 2018, which claims the priority benefit of Japan Patent Application No. 2018-014616, filed on Jan. 31, 2018. The entirety of each of the above-mentioned patent applications is hereby incorporated by reference herein and made a part of this specification.

BACKGROUND

Technical Field

The present disclosure relates to a method for manufacturing a blade for electrophotographic devices, and a blade for electrophotographic devices. More specifically, the present disclosure relates to a method for manufacturing a blade for electrophotographic devices which is suitable as a cleaning blade, a layer formation blade, or the like in an electrophotographic device, and to a blade for electrophotographic devices.

Related Art

A blade is arranged in an electrophotographic device such as a copier, a printer, a facsimile or the like employing an electrophotographic method, the blade including a cleaning blade that is used for removing residual toner remaining on the surface of a mating member by sliding-contact with the mating member such as a photosensitive drum or a transcription belt, a layer formation blade used for forming a uniform toner layer on the outer peripheral surface of a developing roll, or the like.

Urethane rubber excellent in mechanical characteristics such as the abrasion resistance property may be used in a substrate of the blade. However, the blade using the urethane rubber may have a large friction with the mating member to be contacted, and curling up or stick-slip may occur centering on the contact portion. Accordingly, the slipping of the toner or the like may occur. In addition, it is necessary to improve the scrapping property of the toner along with the reduction in diameter of the toner; for example, it is required to make the blade in contact with the photosensitive drum by line contact. Therefore, it is required to make the front end of the blade high in hardness centering on the contact portion. For example, in patent literature 1, it is proposed that the contact portion with the mating member is impregnated with an isocyanate compound and reacts with the urethane rubber to form a cured layer.

LITERATURE OF RELATED ART

Patent Literature

Patent literature 1: Japanese Patent Laid-Open No. 2004-280086

When the contact portion with the mating member has high hardness, a nip width with respect to the mating member becomes narrower, and the coefficient of friction is also reduced. Thereby, curling up or stick-slip is suppressed, and the scrapping property of the toner is improved. On the other hand, as the nip width with respect to the mating member becomes narrower, the influence of the variation in surface hardness increases correspondingly during the contact, and the slipping of the toner due to the cracking of the front end caused by stress concentration or the variation in pressing force against the mating member is easily generated.

A problem to be solved by the present disclosure is to provide a method for manufacturing a blade for electrophotographic devices with which it is possible to suppress the slipping of toner caused by the cracking of a front end or the variation in pressing force against a mating member when an impregnation treatment is performed, and to provide a blade for electrophotographic devices.

SUMMARY

In order to solve the above problem, the method for manufacturing a blade for electrophotographic devices of the present disclosure includes: an impregnation step of impregnating, from the surface of at least a part of a blade-shaped substrate containing urethane rubber, with a blocked isocyanate in which an isocyanate group is blocked with a blocking agent, wherein the part includes a portion that comes into contact with a mating member; and a curing step of dissociating the blocking agent from the blocked isocyanate impregnated into the substrate in the impregnation step, and then curing the released isocyanate in the substrate to form a cured portion in at least the part of the substrate including the portion that comes into contact with the mating member; and the isocyanate released from the blocked isocyanate includes an aromatic isocyanate.

The molecular weight of the blocked isocyanate is preferably 500 or less. The dissociation temperature of the blocking agent in the blocked isocyanate is preferably in a range of 100-160° C. The Martens hardness of the cured portion is preferably 2.0 N/mm$^2$ or more, and the variation in the Martens hardness of the cured portion is preferably 1.5 N/mm$^2$ or less. The Martens hardness at a pressing depth of 50 μm of the substrate before the impregnation step is preferably in a range of 0.1 to 1.0 N/mm$^2$. The urethane rubber of the substrate is preferably formed of a cured product of a urethane composition containing polyol, polyisocyanate, a chain extender, and a crosslinking agent, and the urethane composition preferably contains the chain extender by 40 mass % or more with respect to the total amount of the chain extender and the crosslinking agent.

Then, the blade for electrophotographic devices of the present disclosure includes a blade-shaped substrate containing urethane rubber, and a cured portion provided in at least a part of the substrate comprising a portion that comes into contact with a mating member, wherein from a surface of the at least part of the substrate comprising the portion that comes into contact with the mating member is impregnated with a blocked isocyanate in which an isocyanate group is blocked with a blocking agent is impregnated; the blocking agent is dissociated from the blocked isocyanate impregnated into the substrate and isocyanate is released, and the released isocyanate is cured in the substrate to provide the cured portion in at least the part of the substrate including the portion that comes into contact with the mating member; and the isocyanate released from the blocked isocyanate includes an aromatic isocyanate.

DESCRIPTION OF THE EMBODIMENTS

Figure 1:
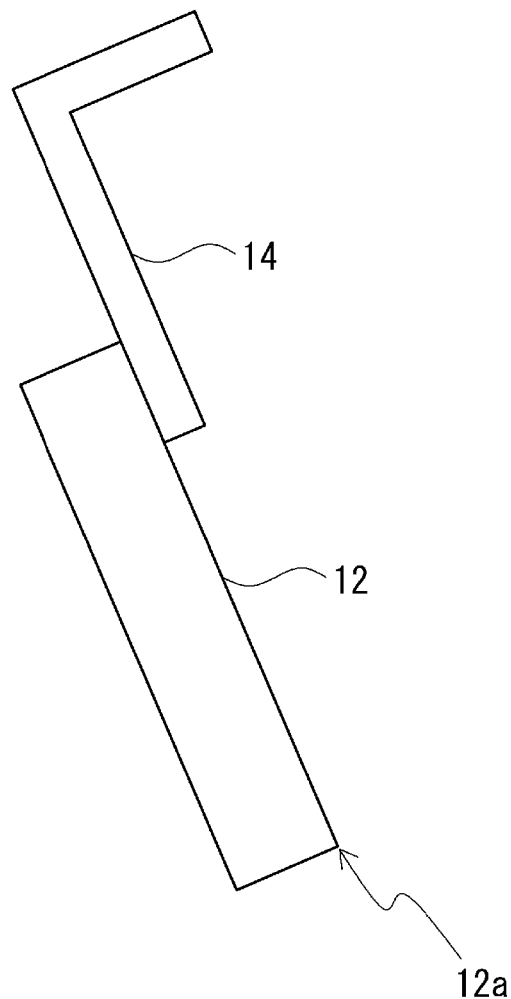
FIG. 1 is a schematic diagram of a blade for electrophotographic devices of an embodiment of the present disclosure.

According to the method for manufacturing a blade for electrophotographic devices of the present disclosure, the blocked isocyanate is impregnated in the impregnation step and thus can be impregnated to a desired impregnation depth while the activity of the isocyanate group is maintained. Besides, the blocking agent is dissociated from the impregnated blocked isocyanate in the subsequent curing step, and the released isocyanate including an aromatic isocyanate is cured in the substrate, and thus the cured portion in which the hardness is sufficiently increased can be uniformly formed. Thereby, the variation in hardness is suppressed in the portion that comes into contact with the mating member, and the slipping of the toner due to the cracking of the front end or the variation in pressing force against the mating member is suppressed.

At this time, when the molecular weight of the blocked isocyanate is 500 or less, the blocked isocyanate is more easily impregnated into the substrate, and the surface hardness is easily increased. Besides, when the dissociation temperature of the blocking agent in the blocked isocyanate is in the range of 100° C. to 160° C., the activity of the isocyanate group is easily maintained in the impregnation step, and heat deterioration of the urethane rubber of the substrate is easily suppressed in the curing step. Besides, when the Martens hardness of the cured portion is 2.0 N/mm$^2$ or more, the scrapping property of the toner is excellent, and when the variation in the Martens hardness of the cured portion is 1.5 N/mm$^2$ or less, the slipping of the toner due to the cracking of the front end or the variation in pressing force against the mating member is easily suppressed. Besides, when the Martens hardness at a pressing depth of 50 μm of the substrate before the impregnation step is in a range of 0.1 to 1.0 N/mm$^2$, the curling up, the stick-slip, or the abrasion of the mating member to be contacted is easily suppressed. Besides, when the ratio of the chain extender in the urethane rubber of the substrate is in the above range, the blocked isocyanate is more easily impregnated into the substrate, and the surface hardness is easily increased.

Then, according to the blade for electrophotographic devices of the present disclosure, because the isocyanate including an aromatic isocyanate released from the blocked isocyanate impregnated into the substrate is cured in the substrate to form the cured portion, the isocyanate including an aromatic isocyanate is cured in the substrate while the activity of the isocyanate group is maintained even at a desired impregnation depth, and thus the cured portion in which the hardness is sufficiently increased can be uniformly formed. Thereby, the variation in hardness is suppressed in the portion that comes into contact with the mating member, and the slipping of the toner due to the cracking of the front end or the variation in pressing force against the mating member is suppressed.

Figure 2:
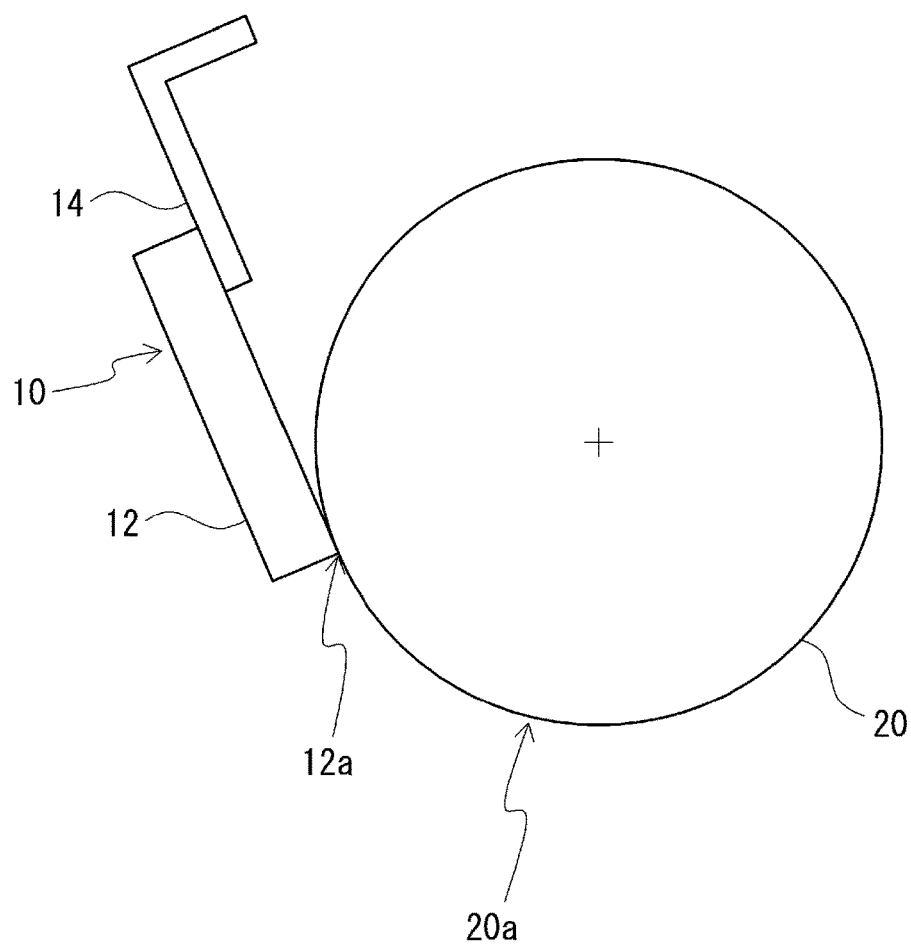
FIG. 2 is a schematic diagram showing a state in which the blade for electrophotographic devices of an embodiment of the present disclosure slides over the outer peripheral surface of a rotating photosensitive drum.
Figure 3:
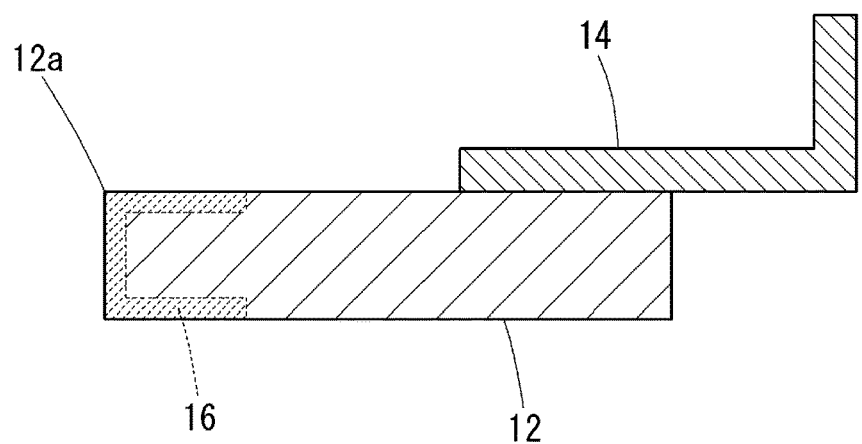
FIG. 3 is a cross-sectional view showing an example of the range in which an impregnation treatment is performed.

Hereinafter, an embodiment of the present disclosure is described using the drawings. FIG. 1 is a schematic diagram showing a blade for electrophotographic devices (hereinafter, also referred to as the blade) of an embodiment of the present disclosure, and FIG. 2 is a schematic diagram showing a state in which the blade slides over the outer peripheral surface of a photosensitive drum. FIG. 3 is a cross-sectional view showing an example of the range in which an impregnation treatment is performed.

As shown in FIG. 1, a blade for electrophotographic devices (the blade) 10 of an embodiment of the present disclosure includes a blade portion 12. A holding portion 14 that holds the blade portion 12 is attached to the blade portion 12. The blade portion 12 has a plate shape (blade shape). The holding portion 14 is made of a metal bracket having an L-shaped cross section or the like. The blade portion 12 comes into contact (sliding-contact) with a mating member at a front end (a ridgeline portion) 12a of the blade portion 12. The front end (the ridgeline portion) 12a becomes a contact portion.

The blade 10 is suitable as a cleaning blade, a layer formation blade or the like in the electrophotographic device. The mating member of the cleaning blade may be a photosensitive drum, a transcription belt, and the like. The mating member of the layer formation blade may be a developing roll and the like. Any one of the blades comes into contact (sliding-contact) with the mating member. The cleaning blade comes into contact with the mating member to remove residual toner. For example, as shown in FIG. 2, the blade portion 12 comes into contact with an outer peripheral surface 20a of a photosensitive drum 20 at the front end (the ridgeline portion) 12a, and slides over the outer peripheral surface 20a of the rotating photosensitive drum 20. Thereby, the toner remaining on the outer peripheral surface 20a of the photosensitive drum 20 is removed. The part including the front end 12a serves as a contact portion that comes into contact with the photosensitive drum 20 which is a member to be cleaned subjected to be cleaned. The layer formation blade comes into contact (sliding-contact) with the surface of a developing roll which is the mating member, and a uniform toner layer is formed on the outer peripheral surface of the developing roll.

The substrate of the blade portion 12 contains urethane rubber. The substrate of the blade portion 12 is configured by a cured product of a urethane composition. The substrate of the blade portion 12 is a formed body that is formed of the urethane composition before the impregnation treatment is performed. As shown in FIG. 3, in the blade portion 12, a cured portion 16 is arranged in the part including a contact portion including the front end 12a of the substrate, wherein the cured portion 16 is formed by curing, in the substrate, isocyanate released from the blocked isocyanate impregnated into the substrate from the surface of the front end 12a of the substrate.

The blade 10 can be manufactured by the method for manufacturing a blade for electrophotographic devices of the present disclosure (hereinafter, also referred to as the manufacturing method). Hereinafter, the manufacturing method is described. The manufacturing method has an impregnation step and a curing step.

The impregnation step is a step of impregnating with a blocked isocyanate from the surface of at least a part of a blade-shaped substrate containing urethane rubber, wherein the part includes a portion that comes into contact with a mating member. In the blocked isocyanate, the isocyanate group is blocked with a blocking agent. In the blocked isocyanate, the blocking agent is dissociated at the temperature above a predetermined dissociation temperature and isocyanate is released. The released isocyanate is the isocyanate forming the blocked isocyanate.

Examples of the isocyanate forming the blocked isocyanate include: diphenyl methane diisocyanate (MDI), polymethylene polyphenylene polyisocyanate (polymeric MDI), crude MDI (c-MDI) that is a mixture of MDI or polymeric MDI, dicyclohexyl methane diisocyanate (hydrogenated MDI), tolylene diisocyanate (TDI), hexamethylene diisocyanate (HDI), trimethyl hexamethylene diisocyanate (TMHDI), isophorone diisocyanate (IPDI), orthotoluidine diisocyanate (TODI), naphthylene diisocyanate (NDI), xylylene diisocyanate (XDI), paraphenylene diisocyanate (PDI), lysine isocyanato methyl ester (LDI), dimethyl diisocyanate (DDI), MDI nurate, HDI nurate, and TDI nurate that are multimers, modified bodies obtained by making the above isocyanate through ureaization, biuretization, allophanation, carbodiimidization, urethanization or the like. In addition, a NCO-terminal urethane prepolymer obtained by reacting the polyisocyanate such as MDI with polyol may be used. These may be singularly used as the isocyanate forming the blocked isocyanate or two or more types of the isocyanate may be used in combination.

When the aromatic isocyanate is included as the isocyanate forming the blocked isocyanate, the surface hardness is increased due to the aromatic isocyanate having high reactivity. Accordingly, the aromatic isocyanate is included as the isocyanate forming the blocked isocyanate. The aromatic isocyanate is the isocyanate in which the isocyanate group is directly bonded to an aromatic ring. Examples of the aromatic isocyanate include MDI, polymeric MDI, crude MDI, TDI, TODI, NDI, PDI, and the like.

From the viewpoint that the blocked isocyanate is easily impregnated into the substrate in the impregnation step, the surface hardness is easily increased, the molecular weight of the blocked isocyanate is preferably 500 or less. More preferably, the molecular weight is 480 or less, and further preferably, the molecular weight is 450 or less.

From the viewpoint that the activity of the isocyanate group is easily maintained while the blocking agent is not dissociated in the impregnation step, the dissociation temperature of the blocked isocyanate is preferably 100° C. or higher. More preferably, the dissociation temperature is 120° C. or higher. In addition, from the viewpoint that the heating temperature for dissociating the blocking agent in the curing step is kept low, the heat deterioration of the urethane rubber of the substrate is easily suppressed, the dissociation temperature is preferably 160° C. or lower. More preferably, the dissociation temperature is 140° C. or lower.

A compound having active hydrogen is used as the blocking agent forming the blocked isocyanate. Examples of the compound having active hydrogen include: oximes, pyrazoles, carbazoles, secondary amine, β-dicarbonyl compound, lactams, phenols, and the like. These compounds may be singularly used as the blocking agent forming the blocked isocyanate, or two or more types of the compounds may be used in combination.

Examples of the oximes include aldoxime and ketoxime. Examples of the aldoxime include formaldoxime, acetaldoxime, and the like. Examples of the ketoxime include dimethyl ketoxime, methyl ethyl ketoxime, methyl isobutyl ketoxime, methyl amyl ketoxime, acetoxime, cyclohexanoneoxime, and the like. Examples of the pyrazoles include pyrazole, 3-methyl pyrazole, 3,5-dimethyl pyrazole, and the like. Examples of the carbazoles include carbazole. Examples of the secondary amine include: dipropyl amine, diisopropyl amine, dibutyl amine, diisobutyl amine, di(tert-butyl) amine, ethyl propyl amine, ethyl isopropyl amine, ethyl butyl amine, ethyl isobutyl amine, ethyl (tert-butyl) amine, dicyclohexyl amine, N-methyl aniline, diphenyl amine, piperidine, 2-methyl piperidine, 2,6-dimethyl piperidine, 2,2,6,6-tetra methyl piperidine, and the like. Examples of the β-dicarbonyl compound include: malonic diesters such as dimethyl malonate and diethyl malonate, acetoacetic esters such as methyl acetoacetate and ethyl acetoacetate, and the like. Examples of the lactams include ε-caprolactam and the like. Examples of the phenols include phenol and the like.

From the viewpoint that the storage stability of the blocked isocyanate is excellent, the dissociation temperature of the blocked isocyanate is suitable, the blocking agent is preferably methyl ethyl ketoxime, diisopropyl amine, phenol, ε-caprolactam, diethyl malonate, 3,5-dimethyl pyrazole, ethyl acetoacetate, and the like. In addition, from the viewpoint that the dissociation temperature of the blocked isocyanate tends to be relatively low, 3,5-dimethyl pyrazole and methyl ethyl ketoxime are preferable.

The blocked isocyanate can be impregnated into the substrate by using a curable composition containing the blocked isocyanate. The curable composition may contain the blocked isocyanate only or contain a solvent or an additive in addition to the blocked isocyanate. In addition, the isocyanate that is not blocked with the blocking agent may also be contained in a range not hindering the disclosure.

Examples of the solvent include methyl ethyl ketone (MEK), methyl isobutyl ketone (MIBK), toluene, methanol, and the like. By using the solvent, the solid content concentration can be adjusted, and the impregnation depth (the impregnation amount) can be adjusted. The solid content concentration refers to a total concentration (mass %) of components other than the solvent. The solid content concentration of the curable composition is preferably in a range of 0.1-80 mass %. The solid content concentration is more preferably in a range of 1.0-70 mass %, further preferably in a range of 3.0-60 mass %.

The impregnation of the blocked isocyanate is performed by, for example, immersing a part or all of the substrate of the blade portion 12 in a liquid of the curable composition containing the blocked isocyanate, injecting (spraying) the liquid of the curable composition to a part or all of the substrate of the blade portion 12, and coating by a brush or the like. At this time, when the additional liquid of the curable composition remains on the substrate surface, the additional liquid can be removed by wiping and cleaning with a solvent. Conditions such as the time, temperature and the like during the impregnation may be set appropriately corresponding to a desired impregnation amount.

From the viewpoint of the surface hardness and the physicality retention of the substrate and the like, the depth (the impregnation depth) at which the blocked isocyanate is immersed in the substrate of the blade portion 12 may be adjusted appropriately. The depth is preferably 50 μm or more from the surface and 300 μm or less from the surface. More preferably, the depth is 100 μm or more from the surface and 200 μm or less from the surface. When the depth is 50 μm or more from the surface, the surface hardness is easily secured. When the depth is 300 μm or less from the surface, the physicality of the substrate is easily secured.

The curing step is a step of dissociating the blocking agent from the blocked isocyanate impregnated into the substrate in the impregnation step, and then curing the released isocyanate in the substrate to form the cured portion 16 in at least a part of the substrate including a portion that comes into contact with the mating member. In the curing step, the substrate impregnated with the blocked isocyanate is heated to a temperature higher than the temperature for dissociating the blocking agent from the blocked isocyanate. At this time, from the viewpoint that the heat deterioration of the urethane rubber of the substrate is easily suppressed, the heating temperature is preferably 160° C. or lower, more preferably 150° C. or lower, further preferably 140° C. or lower. On the other hand, from the viewpoint that the blocking agent can be effectively dissociated from the blocked isocyanate, the heating temperature is preferably 100° C. or higher, more preferably 110° C. or higher, further preferably 120° C. or higher.

In the curing step, the released isocyanate is cured by reacting with the hydroxyl group in the substrate or by self-cross-linking. Thereby, the cured portion 16 is formed in at least the part of the substrate including a portion that comes into contact with the mating member.

The Martens hardness of the cured portion 16 of the blade portion 12 is preferably 1.5 N/mm$^2$ or higher, more preferably 2.0 N/mm$^2$ or higher, further preferably 3.0 N/mm$^2$ or higher. When the Martens hardness of the cured portion 16 is 1.5 N/mm$^2$ or higher, the cured portion 16 is excellent in the surface hardness and excellent in the scrapping property of the toner. Then, the variation in hardness of the cured portion 16 of the blade portion 12 is small. For example, the variation in the Martens hardness of the cured portion 16 is preferably 1.5 N/mm$^2$ or lower. Thereby, the slipping of the toner due to the cracking of the front end (the contact portion) 12a of the blade portion 12 or the variation in pressing force against the mating member is easily suppressed. In addition, from this viewpoint, the variation in the Martens hardness of the cured portion 16 is more preferably 1.0 N/mm$^2$ or lower.

It is inferred that the variation in the Martens hardness of the cured portion 16 is generated because the isocyanate used in the impregnation reacts with moisture in the substrate and is partially deactivated, thereby generating sites that are not sufficiently reacted and cured in the curing step. In the impregnation step of the present disclosure, blocked isocyanate is impregnated instead of isocyanate that is not blocked, and thus the blocked isocyanate can be impregnated to a desired impregnation depth while the activity of the isocyanate group is maintained. Then, the blocking agent is dissociated from the impregnated blocked isocyanate in the following curing step and the released isocyanate is cured in the substrate. Therefore, the isocyanate is suppressed from reacting with the moisture in the substrate and being partially deactivated before curing, and the cured portion 16 with sufficiently increased hardness can be uniformly formed. Thereby, the variation in hardness is suppressed in the portion that comes into contact with the mating member, and the slipping of the toner due to the cracking of the front end (the contact portion) 12a of the blade portion 12 or the variation in pressing force against the mating member is suppressed.

The Martens hardness of the cured portion 16 of the blade portion 12 can be represented by an average value of the Martens hardness at a pressing depth of 1 μm at positions of a total of ten points (five points on each side) with pitches of 20 mm on both sides from the central position of the direction in which the front end (the ridgeline portion) 12a extends, at positions separated by 50 μm from the front end (the ridgeline portion) 12a on the surface facing the mating member. Besides, the variation in the Martens hardness of the cured portion 16 can be represented by a difference between the maximum value and the minimum value of the Martens hardness at a pressing depth of 1 μm at the positions of the ten points in total.

From the viewpoint of suppressing the curling up of the front end 12a and the like, the friction coefficient of the cured portion 16 of the blade portion 12 is preferably 0.9 or lower, more preferably 0.8 or lower, 0.7 or lower, and 0.6 or lower. The friction coefficient (μ) of the cured portion 16 can be measured using a static and dynamic friction coefficient meter. The friction coefficient (μ) of the cured portion 16 can be set in a predetermined range according to the formulation of the urethane composition, the type of the blocked isocyanate, the solid content concentration and the impregnation amount (the impregnation depth) of the curable composition containing blocked isocyanate, and the like.

The substrate of the blade portion 12 can be produced by injecting the urethane composition into a predetermined formation mold for formation. The cast formation can be performed according to a prepolymer method, a semi-one-shot method, and a one-shot method. From the excellence in machinability and the like, the semi-one-shot method is preferable. In the semi-one-shot method, by preparing a urethane prepolymer (main agent liquid) from polyisocyanate and polyol, combining polyol and a chain extender, a crosslinking agent, a catalyst, an additive and the like as necessary to prepare a curing agent liquid, mixing the main agent liquid and the curing agent liquid at a predetermined ratio to form a urethane composition, and injecting the urethane composition to the formation mold to perform reaction and curing, the substrate of the blade portion 12 having a predetermined shape can be produced. The holding portion 14 is partially embedded in the substrate of the blade portion 12 during the formation or adhered to a predetermined position using an adhesive after the formation of the substrate of the blade portion 12, and thereby can be integrated with the substrate of the blade portion 12.

The urethane composition forming the substrate of the blade portion 12 contains polyol and polyisocyanate. The polyol and the polyisocyanate are not particularly limited as long as they are polyol and polyisocyanate for urethane rubber formation used for forming the urethane rubber.

The polyol of the urethane composition is not particularly limited and may be polyester polyol, polyether polyol, polycarbonate polyol, acrylic polyol, and the like. In particular, the polyester polyol is more preferable.

Polyester polyol obtained from a polybasic organic acid and low-molecular-weight polyol and taking a hydroxyl group as a terminal group can be exemplified as suitable polyester polyol. By using the polyester polyol as the polyol for forming the polyurethane, the abrasion resistance property necessary for endurance can be secured. The polybasic organic acid is not particularly limited and may be: saturated fatty acids such as oxalic acid, succinic acid, glutaric acid, adipic acid, pimelic acid, suberic acid, azelaic acid, sebacic acid, and isosebacic acid; unsaturated fatty acids such as maleic acid and fumaric acid; dicarboxylic acids of aromatic acids or the like such as phthalic acid, isophthalic acid, and terephthalic acid; acid anhydrides such as maleic anhydride, and phthalic anhydride; dialkyl esters such as dimethyl terephthalate; dimer acids obtained by dimerization of unsaturated fatty acids; and the like. The low-molecular-weight polyol used together with the polybasic organic acid is not particularly limited and may be, for example, diols such as ethylene glycol, diethylene glycol, triethylene glycol, propylene glycol, dipropylene glycol, butylene glycol, neopentyl glycol, and 1,6-hexylene glycol; triols such as trimethylolethane, trimethylolpropane, hexanetriol, and glycerin; hexaols such as sorbitol; and the like.

Specifically, more suitable polyester polyol include: polyethylene adipate (PEA), polybutylene adipate (PBA), polyhexylene adipate (PHA), copolymer of ethylene adipate and butylene adipate (PEA/BA), and the like. One type of these polyester polyols may be singularly used, or two or more types may be used in combination. In particular, from the viewpoint of the improvement in abrasion resistance property, the improvement in durability, and the like, polybutylene adipate (PBA) is particularly preferable.

The number average molecular weight of the polyester polyol is preferably 1000-3000. A tan δ peak temperature and a tan δ peak value serving as indexes of the viscoelasticity of the urethane are adjusted, and the physicality security and the formability improvement are easily obtained. From this viewpoint, the number average molecular weight is more preferably 1500-2500.

Examples of the polyether polyol include polypropylene glycol (PPG), polytetramethylene glycol (PTMG), ethylene oxide modified-type polyol of the two, polyethylene glycol (PEG), and the like. The average molecular weight (Mn) of the polyether polyol is preferably 1000-10000.

Examples of the polyisocyanate of the urethane composition include: diphenyl methane diisocyanate (MDI), polymethylene polyphenylene polyisocyanate (polymeric MDI), crude MDI (c-MDI) that is a mixture of MDI or polymeric MDI, dicyclohexyl methane diisocyanate (hydrogenated MDI), tolylene diisocyanate (TDI), hexamethylene diisocyanate (HDI), trimethyl hexamethylene diisocyanate (TMHDI), isophorone diisocyanate (IPDI), orthotoluidine diisocyanate (TODI), naphthylene diisocyanate (NDI), xylylene diisocyanate (XDI), paraphenylene diisocyanate (PDI), lysine isocyanato methyl ester (LDI), dimethyl diisocyanate (DDI), MDI nurate, HDI nurate, and TDI nurate that are multimers, modified bodies obtained by making the above polyisocyanate into urea compound, biuret, allophanate, carbodiimide, urethane, and the like. One type of these polyisocyanate may be singularly used as the isocyanate of the urethane composition, or two or more types may be used in combination. In particular, from the viewpoint of the improvement in abrasion resistance property, ease of handling, ease of access, cost, and the like, 4,4'-diphenyl methane diisocyanate (MDI) is particularly preferable.

The polyisocyanate of the urethane composition may be a NCO-terminal urethane prepolymer obtained by causing the polyisocyanate such as MDI to react with polyol. The urethane prepolymer used as the polyisocyanate has the NCO-terminal, and thus the NCO % is preferably 5-30 mass %. The NCO % is calculated by the following expression.

$$NCO\% = \frac{\dfrac{\text{polyisocyanate weight}}{\text{polyisocyanate equivalent}} - \dfrac{\text{polyol weight}}{\text{polyol equivalent}} \times 42.02}{\text{polyisocyanate weight} + \text{polyol weight}} \times 100 \quad \text{[Expression 1]}$$

From the viewpoint of easily improving the abrasion resistance property, easily securing the strength, not easily deteriorating, and the like, the blending amount of the polyisocyanate is preferably set so that a NCO index (an isocyanate index) is 110 or more. The NCO index is more preferably 115 or more, further preferably 120 or more, 125 or more, and 130 or more. On the other hand, from the viewpoint of not becoming too hard, satisfying the cleanliness at a low temperature, easy formation, and the like, the NCO index is preferably set to 250 or less. The NCO index is more preferably 200 or less, further preferably 180 or less. The NCO index is calculated as an equivalent of the isocyanate group with respect to a total equivalent 100 of the active hydrogen groups (hydroxyl group, amino group, or the like) reacting with the isocyanate group.

The urethane composition may contain, in addition to the polyol and the polyisocyanate, a chain extender, a crosslinking agent, a catalyst, a foaming agent, a surfactant agent, a flame retardant, a colorant, a filler, a plasticizer, a stabilizer, a mold release agent, a conductive agent, and the like. The catalyst is used for accelerating the urethanization reaction of the urethane composition.

The chain extender is a two-functional compound such as a diol or a diamine that is capable of reacting with the polyurethane. Preferably, the number average molecular weight is 300 or less. Examples of the chain extender include: diols such as 1,4-butanediol (1,4-BD), ethylene glycol (EG), 1,6-hexanediol (1,6-HD), diethylene glycol (DEG), propylene glycol (PG), dipropylene glycol (DPG), 1,4-cyclohexanediol, 1,4-cyclohexanedimethanol, xylene glycol, triethylene glycol, or aromatic diamines such as 2,2',3,3'-tetrachloro-4,4'-diaminodiphenylmethane, 3,3'-dichloro-4,4'-diphenylmethane, trimethylene-bis (4-aminobenzoate), 4,4'-diamino-3,3'-diethyl-5,5'-dimethyl diphenylmethane, and the like. One type of these chain extenders may be singularly used, or two or more types may be used in combination. In particular, from the viewpoint that the tans peak temperature and the tans peak value serving as indexes of the hardness of the polyurethane and the viscoelasticity of the polyurethane are adjusted and the physicality security and the formability improvement are easily obtained, 1,4-butanediol (1,4-BD), ethylene glycol (EG), 1,6-hexanediol (1,6-HD), and the like are suitable.

The crosslinking agent is a three-functional compound such as a triol or a triamine that is capable of reacting with the polyurethane. Preferably, the number average molecular weight is 300 or less. Examples of the crosslinking agent include: trimethylol propane (TMP), glycerin, pentaerythritol, sorbitol, 1,2,6-hexanetriol, and the like. One type of these crosslinking agents may be singularly used, or two or more types may be used in combination. In particular, from the viewpoint that the tan δ peak temperature and the tan δ peak value serving as indexes of the hardness of the polyurethane and the viscoelasticity of the polyurethane are adjusted and the physicality security and the formability improvement are easily obtained, trimethylol propane (TMP) and the like are preferable.

In the urethane composition, regarding the ratio of the chain extender and the crosslinking agent, from the viewpoint that the blocked isocyanate is easily immersed (easily impregnated) in the substrate and the like, the chain extender is preferably 40 mass % or more with respect to the total of the chain extender and the crosslinking agent, more preferably 50 mass % or more. On the other hand, from the viewpoint of the permanent deformation and the formability of the substrate and the like, the chain extender is preferably 80 mass % or less with respect to the total of the chain extender and the crosslinking agent, more preferably 75 mass % or less.

The catalyst is not particularly limited and may be, for example, an amine-based compound such as tertiary amine, an organometallic compound such as organic tin compound, and the like. The catalyst is a catalyst that accelerating the urethanization and the isocyanuratation. The tertiary amine may be, for example, trialkyl amines such as triethyl amine, tetraalkyl diamines such as N,N,N',N'-tetramethyl-1,3-butane diamine, amino alcohols such as dimethyl ethanol amine, ethoxylated amine, ethoxylated diamine, ester amines such as bis(diethyl ethanol amine) adipate, triethylene diamine (TEDA), cyclohexyl amine derivatives such as N,N-dimethyl cyclohexyl amine, morpholine derivatives such as N-methyl morpholine and N-(2-hydroxypropyl)-dimethyl morpholine, piperazine derivatives such as N,N'-diethyl-2-methyl piperazine and N,N'-bis-(2-hydroxypropyl)-2-methyl piperazine, and the like. In addition, the organic tin compound may be, for example, dialkyl tin compounds such as dibutyl tin dilaurate and dibutyl tin di(2-ethyl hexoate), stannous 2-ethylcarbronate, stannous oleate, or the like. One type of these organic tin compounds may be singularly used, or two or more types may be used in combination. In particular, from the viewpoint of resistance to hydrolysis and less pollution caused by bleeding, triethylene diamine (TEDA) is preferably used.

The content of the catalyst in the urethane composition is not particularly limited as long as the content is in a range for suitably accelerating the urethanization reaction. For example, the content is preferably in a range of 0.01-5 parts by mass with respect to 100 parts by mass of the polyol. The content is more preferably in a range of 0.1-3 parts by mass.

From the viewpoint that the curling up of the front end 12a of the blade portion 12 is easily suppressed and the like, the Martens hardness of the substrate of the blade portion 12 is preferably 0.1 N/mm² or higher, more preferably 0.2 N/mm² or more. In addition, from the viewpoint that the wear or cracking of the front end 12a of the blade portion 12 is easily suppressed and the abrasion of the mating member to be contacted is easily suppressed, the Martens hardness is preferably 1.0 N/mm² or lower, more preferably 0.8 N/mm² or lower. The Martens hardness of the substrate of the blade portion 12 is the Martens hardness of the substrate before the impregnation step. The Martens hardness of the substrate of the blade portion 12 is the Martens hardness at a pressing depth of 50 μm. It is sufficient as long as the Martens hardness is in a predetermined range at an arbitrary position of the substrate. The Martens hardness of the substrate of the blade portion 12 can be set to the predetermined range by adjusting the urethane composition.

According to the manufacturing method having the above configuration, the blocked isocyanate is impregnated in the impregnation step, and thus the blocked isocyanate can be impregnated to a desired impregnation depth while the activity of the isocyanate group is maintained. Then, because the blocking agent is dissociated from the impregnated blocked isocyanate in the following curing step, and the released isocyanate including the aromatic isocyanate is cured in the substrate, the cured portion 16 with sufficiently increased hardness can be uniformly formed. Thereby, the variation in hardness is suppressed in the portion that comes into contact with the mating member, and the slipping of the toner due to the cracking of the front end 12a or the variation in pressing force against the mating member is suppressed.

The embodiment of the present disclosure has been described above in detail, but the present disclosure is not limited to the above embodiment, and various changes can be made in a range not departing from the gist of the present disclosure.

EXAMPLE

Hereinafter, examples are used to describe the present disclosure in detail, but the present disclosure is not limited to this configuration.

Examples 1-7

<Preparation of Urethane Composition>

A main agent (NCO-terminal urethane prepolymer, NCO %=17.0%) was prepared by mixing vacuum-defoamed PBA (44 parts by mass) and MDI (56 parts by mass) and causing them to react with each other at 80° C. for 180 min in a nitrogen environment.

Next, a curing agent (hydroxyl value 210 (KOHmg/g)) was prepared by mixing PBA (87 parts by mass), low-molecular-weight polyol (13 parts by mass) obtained by mixing 1,4BD and TMP at a molar ratio of 5:5, and TEDA (0.01 parts by mass) serving as a curing catalyst at 80° C. for 60 min in a nitrogen environment. Next, the main agent (100 parts by mass) and the curing agent (94 parts by mass) are mixed at 60° C. for 3 min and sufficiently defoamed in a vacuum environment. Thereby, the polyurethane composition was prepared.

PBA (polybutylene adipate): "NIPPOLLAN 4010" made by Nippon Polyurethane Industry Co., Ltd.

MDI (4,4'-diphenylmethane diisocyanate): "MILLION-ATE MT" made by Nippon Polyurethane Industry Co., Ltd.

TMP (trimethylol propane): made by Mitsubishi Gas Chemical Co., Inc.

1,4BD (1,4-butanediol): made by Mitsubishi Chemical Corporation

TEDA (triethylene diamine): made by Tosoh Corporation

<Preparation of Curable Composition>

For a base isocyanate (the aromatic isocyanate) heated to 70° C., the blocking agent was slowly dripped for 2 h so as not to change the temperature. After adding the blocking agent, the reaction was continued at 70° C. for 1 h. Thereby, the blocked isocyanate was synthesized. Thereafter, the blocked isocyanate was cooled to room temperature and was diluted with THF so that the solid content concentration was 10 mass %, and thereby a curable composition for surface processing was prepared.

(Base Isocyanate)
MDI: "MILLIONATE MT" made by Tosoh Corporation
TDI: "COSMONATE T100" made by Tosoh Corporation
polymeric MDI: "LPRANATE MSS" made by BASF INOAC Polyurethane (Blocking Agent)
dimethyl pyrazole: made by Tokyo Chemical Industry Co., Ltd.
MEK oxime (methyl ethylketoxime): made by Tokyo Chemical Industry Co., Ltd.
diisopropyl amine: made by Tokyo Chemical Industry Co., Ltd.
ε-caprolactam: made by Tokyo Chemical Industry Co., Ltd.

<Production of Blade>

After a plate-shaped holder was disposed in a molding die for blade and the prepared urethane composition was injected into the molding die, the urethane composition was heated to 130° C. and cured, demolded and cut, thereby producing a formation body in which the blade portion and the holding potion are integrated. Next, a predetermined range of the blade portion (as shown in FIG. 3, the front end including the contact portion) was immersed for 30 min in the prepared curable composition, and the curable composition was impregnated in the substrate of the blade portion (the impregnation depth of 100 μm). Next, the curable composition remaining on (not immersed in) the surface of the substrate of the blade portion was cleaned and removed by MEK. Next, the curable composition impregnated in the blade portion was cured by heating at 160° C. for 20 min. Thereby, the blade was produced.

Comparative Example 1

Except that the substrate was not impregnated with the blocked isocyanate and the isocyanate, a blade of Comparative Example 1 was produced in the same manner as the examples.

Comparative Example 2

Except that isocyanate (MDI) was used instead of the blocked isocyanate in the impregnated curable composition, a blade of Comparative Example 2 was produced in the same manner as the examples.

Comparative Example 3

Figure 4:
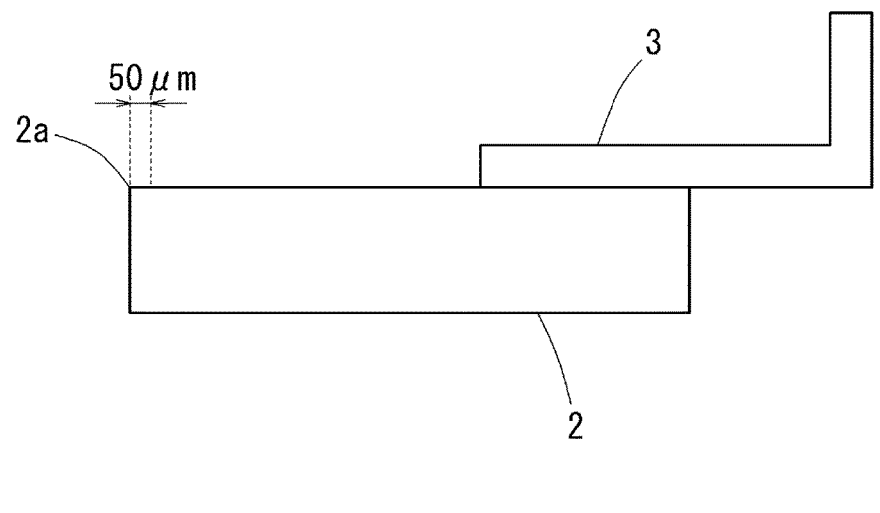
FIG. 4 is a schematic diagram showing a measurement method of the Martens hardness of a cured portion. (a) of FIG. 4 is a side view of a blade, and (b) of FIG. 4 is a plan view of the blade. A blade 1 has a plate-shaped (blade-shaped) blade portion 2, and a holding portion consisting of a metal bracket having an L-shaped cross section.
Figure 4:
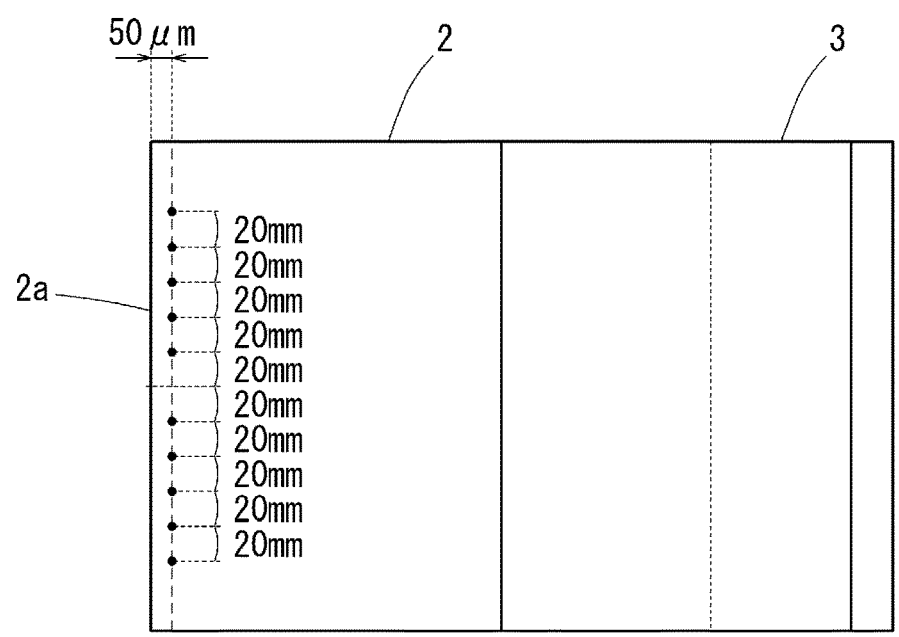

Except that HDI was used as the base isocyanate in the preparation of the curable composition, a blade of Comparative Example 3 was produced in the same manner as the examples.
HDI: "HDI" made by Tosoh Corporation
For each blade that was produced, the Martens hardness of the cured portion was measured, and the variation in hardness of the cured portion was investigated. In addition, for each blade that was produced, a printing intermittent endurance test was performed to investigate the occurrence of defects like the slipping of the toner and the cracking of the front end. Evaluation results are shown in the following table together with the formulation (parts by mass) of the urethane composition and the information of the curable composition.
(Measurement Method of Martens Hardness of Cured Portion)
As shown in (a) and (b) of FIGS. 4, at the positions separated by 50 μm from the front end (the ridgeline portion) 2a on the surface of the produced blade 1 facing the mating member, measurement was made on the Martens hardness at a pressing depth of 1 μm at positions of a total of ten points (five points on each side) with pitches of 20 mm on both sides from the central position of the direction in which the front end (the ridgeline portion) 12a extends, the average value of the ten points was set as the Martens hardness of the cured portion, and the difference between the maximum value and the minimum value of the ten points was set as the variation in hardness of the cured portion.
(Toner Slipping)
The blade was incorporated into a commercial laser printer ("Color Laser JetPro M452dw" made by HP) as a cleaning blade, and 10,000 pieces were printed by a 5% printing intermittent endurance test in a HH environment (30° C.×85% RH). Confirmation was made on whether the toner slipped through the whole part of the blade that comes into contact with the mating member due to the softness and a fusion object is caused by the toner slipping on a drum surface, and whether an image defect caused by the fusion object is generated. When there is no fusion object on the drum surface and no defect caused by the fusion on the image, the prevention effect for the toner slipping is excellent, which is denoted by "◎"; when it can be confirmed that there is a minor fusion object on the drum surface but no defect caused by the fusion on the image, the prevention effect for the toner slipping is good, which is denoted by "○"; when it can be confirmed that there is a fusion object on the drum surface and there is slight image defect caused by the fusion on the image, the prevention effect for the toner slipping is fair, which is denoted by "Δ"; and when it can be confirmed that there is a fusion object on the drum surface and there is image defect caused by the fusion on the image, the prevention effect for the toner slipping is poor, which is denoted by "x".
(Front End Cracking)
The blade was incorporated into the commercial laser printer ("Color Laser JetPro M452dw" made by HP) as a cleaning blade, and 10,000 pieces were printed by the 5% printing intermittent endurance test in a LL environment (10° C.×10% RH). When the cracking of a depth of 2 μm or more is generated at the front end (the contact portion) of the blade, and image defect resulted from the pollution of an electrified roll caused by the cracking is confirmed, the case is defined as fail by "x", and a case in which neither cracking nor image defect is confirmed is defined as acceptable by "○".

TABLE 1

| | | | Example | | | | | | | Comparative Example | | |
|---|---|---|---|---|---|---|---|---|---|---|---|---|
| | | | 1 | 2 | 3 | 4 | 5 | 6 | 7 | 1 | 2 | 3 |
| Substrate | Prepolymer | PBA | 56 | 56 | 56 | 56 | 56 | 56 | 56 | 56 | 56 | 56 |
| | | MDI | 44 | 44 | 44 | 44 | 44 | 44 | 44 | 44 | 44 | 44 |
| | | NCO % (mass %) | 17 | 17 | 17 | 17 | 17 | 17 | 17 | 17 | 17 | 17 |
| | Curing agent | Polyisocyanate | 87 | 87 | 87 | 87 | 87 | 87 | 87 | 87 | 87 | 87 |
| | | Chain extender: a | 6.5 | 6.5 | 6.5 | 6.5 | 6.5 | 6.5 | 3.9 | 6.5 | 6.5 | 6.5 |
| | | Crosslinking agent: b | 6.5 | 6.5 | 6.5 | 6.5 | 6.5 | 6.5 | 9.1 | 6.5 | 6.5 | 6.5 |
| | | a/(a + b) mass % | 50 | 50 | 50 | 50 | 50 | 50 | 30 | 50 | 50 | 50 |
| | | Hydroxyl value [KOHmg/g] | 210 | 210 | 210 | 210 | 210 | 210 | 210 | 210 | 210 | 210 |
| | Curing catalyst | TEDA | 0.20 | 0.20 | 0.20 | 0.20 | 0.20 | 0.20 | 0.20 | 0.20 | 0.20 | 0.20 |
| | | Curing agent amount (with respect to prepolymer 100 parts by mass) | 94 | 94 | 94 | 94 | 94 | 94 | 94 | 94 | 94 | 94 |
| | | Martens hardness before impregnation (N/mm$^2$) | 0.3 | 0.3 | 0.3 | 0.3 | 0.3 | 0.5 | 0.3 | 0.3 | 0.3 | 0.3 |

TABLE 1-continued

|  |  | Example | | | | | | | Comparative Example | | |
|---|---|---|---|---|---|---|---|---|---|---|---|
|  |  | 1 | 2 | 3 | 4 | 5 | 6 | 7 | 1 | 2 | 3 |
| Blocked isocyanate | No. | <1> | <2> | <3> | <4> | <5> | <6> | <1> | — | — | <7> |
|  | Isocyanate | MDI | MDI | MDI | TDI | Polymeric MDI | MDI | MDI | — | MDI | HDI |
|  | Blocking agent | DMP | MEKO | DIPA | MEKO | MEKO | ε-cap. | DMP | — | — | MEKO |
|  | Molecular weight | 442 | 424 | 452 | 348 | 655 | 400 | 442 | — | 250 | 342 |
|  | Dissociation temperature (° C.) | 105 | 130 | 140 | 130 | 130 | 158 | 105 | — | — | 130 |
| Martens hardness of cured portion (N/mm$^2$) |  | 5.2 | 3.8 | 4.5 | 6.0 | 1.5 | 1.6 | 1.5 | — | 6.3 | 1.1 |
| Variation in hardness of cured portion (N/mm$^2$) |  | 1.1 | 0.7 | 1.2 | 0.8 | 0.3 | 0.3 | 0.2 | — | 2.7 | 0.2 |
| Toner slipping |  | ◎ | ◎ | ◎ | ◎ | Δ | Δ | Δ | x | ◎ | x |
| Front end cracking |  | ○ | ○ | ○ | ○ | ○ | ○ | ○ | ○ | x | ○ |

MDI: diphenylmethane diisocyanate
TDI: tolylene diisocyanate
polymeric MDI: polymethylene polyphenyl polyisocyanate
HDI: hexamethylene diisocyanate
DMP: dimethyl pyrazole
MEKO: MEK oxime
DIPA: diisopropyl amine
ε-cap.: ε-caprolactam As shown from the examples, by impregnating the blocked isocyanate in the range including the contact portion of the blade portion, dissociating the blocking agent from the impregnated blocked isocyanate, and curing the released isocyanate containing the aromatic isocyanate in the substrate of the blade portion, the hardness is sufficiently increased and the variation in hardness is suppressed, and both the toner slipping over the whole contact potion due to the softness and the toner slipping caused by the cracking of the front end are suppressed. On the other hand, when the impregnation treatment is not performed with the isocyanate, the toner slipping caused by the cracking of the front end does not occur, but the toner slipping over the whole contact portion due to the softness is not suppressed (Comparative Example 1). In addition, it is clear that, when unblocked isocyanate is impregnated and cured, the hardness is sufficiently increased and thus the toner slipping over the whole contact portion due to the softness does not occur, but the variation in hardness is not suppressed, and the toner slipping caused by the cracking of the front end is not suppressed (Comparative Example 2). In addition, even when the blocked isocyanate is impregnated and cured, the hardness is not sufficiently increased and the toner slipping over the whole contact portion is not suppressed when the isocyanate released from the blocked isocyanate is an aliphatic isocyanate (Comparative Example 3).

Then, as shown from Example 5 and other examples, when the molecular weight of the blocked isocyanate is 500 or lower, the blocked isocyanate is easily impregnated, the Martens hardness of the cured portion becomes higher, and the toner slipping over the whole contact portion is more easily suppressed. In addition, as shown from Example 6 and other examples, when the dissociation temperature of the blocked isocyanate is 140° C. or lower, the Martens hardness of the cured portion becomes higher, and the toner slipping over the whole contact portion is more easily suppressed. In addition, as shown from Examples 7 and 1, the content of the chain extender with respect to the total of the chain extender and the crosslinking agent is 40 mass % or more in the substrate, and thereby the blocked isocyanate is easily impregnated, the Martens hardness of the cured portion becomes higher, and the toner slipping over the whole contact portion is more easily suppressed.

The embodiment of the present disclosure has been described above in detail, but the present disclosure is not limited to the above examples, and various changes can be made in a range not departing from the gist of the present disclosure.

What is claimed is:

1. A method for manufacturing a blade for electrophotographic devices, comprising:
   an impregnation step of impregnating, from a surface of at least a part of a blade-shaped substrate containing urethane rubber, with a blocked isocyanate in which an isocyanate group is blocked with a blocking agent, wherein the part comprises a portion that comes into contact with a mating member; and
   a curing step of dissociating the blocking agent from the blocked isocyanate impregnated into the substrate in the impregnation step, and then curing the released isocyanate in the substrate to form a cured portion in at least the part of the substrate comprising the portion that comes into contact with the mating member,
   wherein the isocyanate released from the blocked isocyanate comprises an aromatic isocyanate,
   a Martens hardness of the cured portion is 2.0 N/mm$^2$ or more, and a variation in the Martens hardness of the cured portion is 1.5 N/mm$^2$ or less,
   wherein
   the cured portion has a ridgeline portion that comes into contact with the mating member;
   the Martens hardness of the cured portion is an average value of the Martens hardness at a pressing depth of 1 μm at positions of a total of ten points separated by 50 μm from the ridgeline portion on the surface facing the mating member, wherein the total of 10 points are 5 points on each side and with pitches of 20 mm on both sides from the central position of the direction in which the ridgeline portion extends; and
   the variation in the Martens hardness of the cured portion is the difference between the maximum value and the minimum value of the Martens hardness at the pressing depth of 1 μm at the positions of the total of ten points,
   the molecular weight of the blocked isocyanate is 500 or less,
   the dissociation temperature of the blocking agent in the blocked isocyanate is in a range of 100° C. to 160° C.,
   the Martens hardness at the pressing depth of 50 μm of the substrate before the impregnation step is in a range of 0.1 to 1.0 N/mm$^2$, the urethane rubber of the substrate is formed of a cured product of a urethane composition containing polyol, polyisocyanate, a chain extender, and a crosslinking agent, and the urethane composition contains the chain extender by 40 mass % or more with respect to the total amount of the chain extender and the crosslinking agent.

* * * * *